United States Patent [19]
Sakamoto et al.

[11] Patent Number: 5,365,573
[45] Date of Patent: Nov. 15, 1994

[54] CORDLESS TELEPHONE SYSTEM INCLUDING DETACHABLE RADIO UNIT FOR COMMUNICATING WITH A BASE UNIT AND A MOBILE UNIT

[75] Inventors: Naruhiko Sakamoto, Tokyo; Shinjiro Ishida, Iruma, both of Japan

[73] Assignee: Casio Computer Co., Ltd., Tokyo, Japan

[21] Appl. No.: 35,727

[22] Filed: Mar. 23, 1993

[30]   Foreign Application Priority Data

Mar. 30, 1992 [JP] Japan .................................. 4-74536

[51] Int. Cl.$^5$ ........................................... H04M 11/00
[52] U.S. Cl. ..................................................... 379/61
[58] Field of Search ................... 379/58, 61, 67, 433, 379/110; 455/89, 90, 11.1, 15, 74, 95

[56]       References Cited
U.S. PATENT DOCUMENTS

| | | | |
|---|---|---|---|
| 4,591,661 | 5/1986 | Benedetto et al. | 379/61 |
| 4,881,259 | 11/1989 | Scordato | 379/58 |
| 4,882,745 | 11/1989 | Silver | 379/61 |
| 5,249,302 | 9/1993 | Metroka et al. | 455/11.1 |

FOREIGN PATENT DOCUMENTS

3434686  4/1986  Germany .............................. 379/61

*Primary Examiner*—Curtis Kuntz
*Assistant Examiner*—Michael B. Chernoff
*Attorney, Agent, or Firm*—Frishauf, Holtz, Goodman & Woodward

[57]       ABSTRACT

In a cordless telephone system, a radio communication unit is detachably connected to a base unit of the cordless telephone system. While the radio communication unit is electrically and physically separated from the telephone base unit, and brought out from a home or a firm, a radio communication is established between the radio communication unit and a telephone mobile unit, but also between the telephone mobile unit and a telephone subscriber via the base unit. Thus, an outdoor type telephone mobile unit is available in the cordless telephone system.

14 Claims, 6 Drawing Sheets

CORDLESS TELEPHONE SYSTEM INCLUDING DETACHABLE RADIO UNIT FOR COMMUNICATING WITH A BASE UNIT AND A MOBILE UNIT

BACKGROUND OF THE INVENTION

1. Field of the Invention

The present invention generally relates to a cordless telephone system. More specifically, the present invention is directed to a cordless telephone system equipped with a detachable radio unit capable of achieving an outdoor telephone communication.

2. Description of the Prior Art

Recently, a so-called "cordless telephone system" (namely, a system wherein wireless communication is available between a base unit (telephone receiver unit) and a remote mobile unit (cordless telephone handset) in a telephone set) has been widely utilized. That is, a base unit connected to a public telephone network has one or plural mobile units, and a radio telephone communication is available from this mobile unit via the base unit to an arbitrary telephone subscriber.

In the known cordless telephone system, wireless (radio) communications are available between one mobile unit and the base unit, and also between one mobile unit and the other mobile unit. However, since such a radio communication must be carried out via the base unit, there is a certain limitation in the communication route. That is, although the radio communication is available between two mobile units inside a housing, no radio communication is available between them outside the housing (outdoor radio communication), but also between the base unit installed inside the housing and the outdoor mobile unit.

Very recently, a so-termed "second generation cordless telephone system" has been proposed in which a private radio communication station is installed either in a housing, or a firm, and also a public radio communication station is installed outside the housing or firm, whereby a telephone communication can be established by using the home-use cordless telephone receivers (i.e., mobile units) not only within the home or firm, but also outside the home or firm. Also in the second generation cordless telephone system, the radio power outputs of the base unit and the mobile units are limited to those of the conventional cordless telephone system. Under such a circumstance, practically speaking, the radio communication is available only between the base unit and the mobile unit.

SUMMARY OF THE INVENTION

An object of the present invention is to provide a cordless telephone base unit capable of establishing a radio communication between a mobile unit even in an outdoor field.

A major feature of the present invention is that in a cordless telephone base unit equipped with a radio communication unit for performing a radio communication with a mobile unit and a channel interface unit for connecting this radio communication unit with a subscriber's line, the radio communication unit is constructed as a detachable unit with respect to the main body of this cordless telephone base unit.

That is, the cordless telephone system, according to one aspect of the present invention, comprises:

a telephone appliance body;

a radio communication unit detachably connected to the telephone appliance body, for performing a radio communication with a mobile unit; and a circuit interface unit provided within the appliance body, for connecting the radio communication unit with a subscriber line.

In accordance with this cordless telephone system, the radio communication unit of the base unit is detachably connected to this base unit. While this radio communication unit is portable in an outdoor field, radio communications are freely available between the base unit and the mobile unit, or between the mobile units.

BRIEF DESCRIPTION OF THE DRAWINGS

For a better understanding of the present invention, reference is made of the following descriptions in conjunction with the accompanying drawings in which.

DESCRIPTION OF THE PREFERRED EMBODIMENTS

Outer View of First Cordless Telephone System

Figure 1:
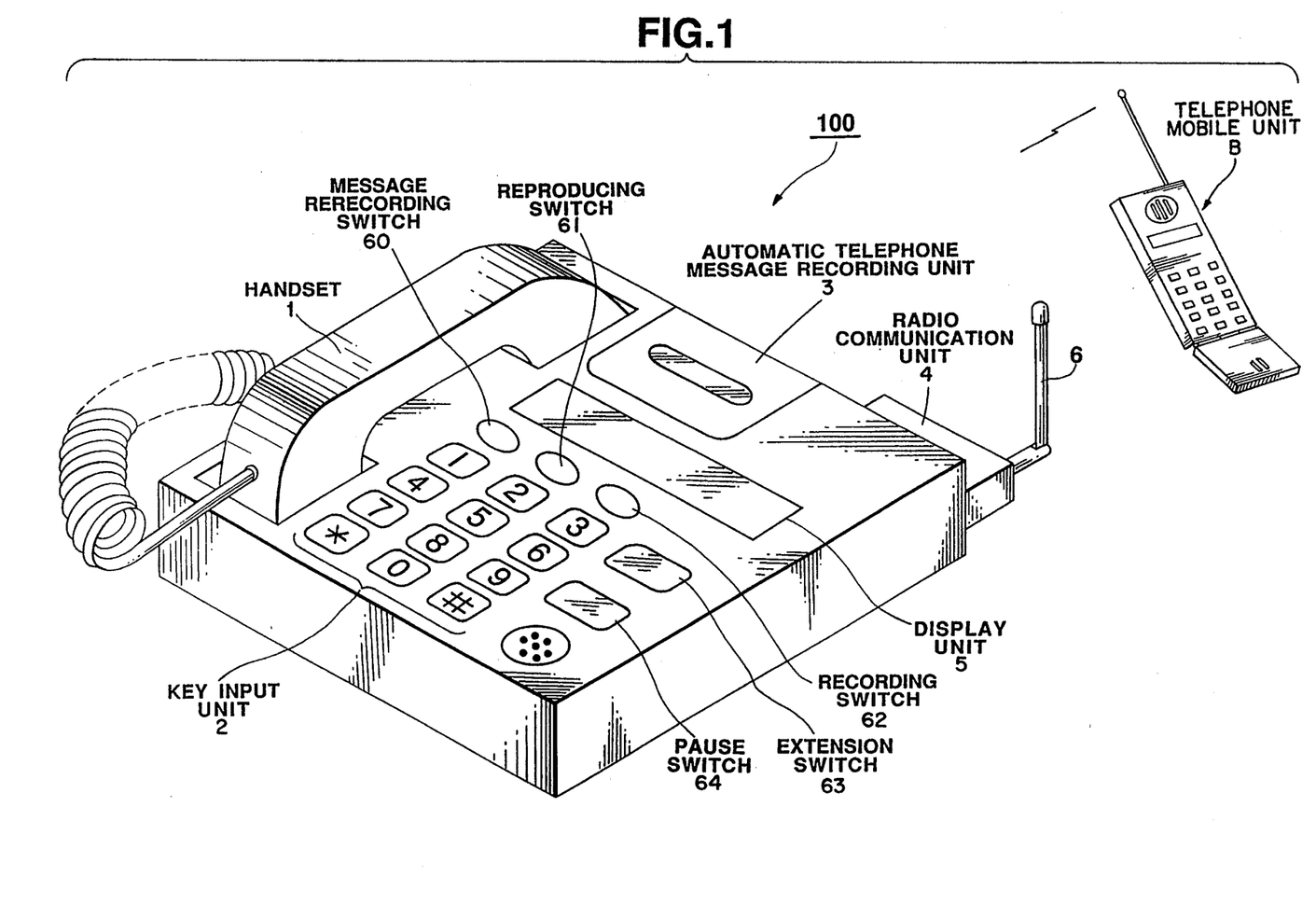
FIG. 1 is a perspective view of a cordless telephone receiver unit according to a first preferred embodiment of the present invention.
Figure 2:
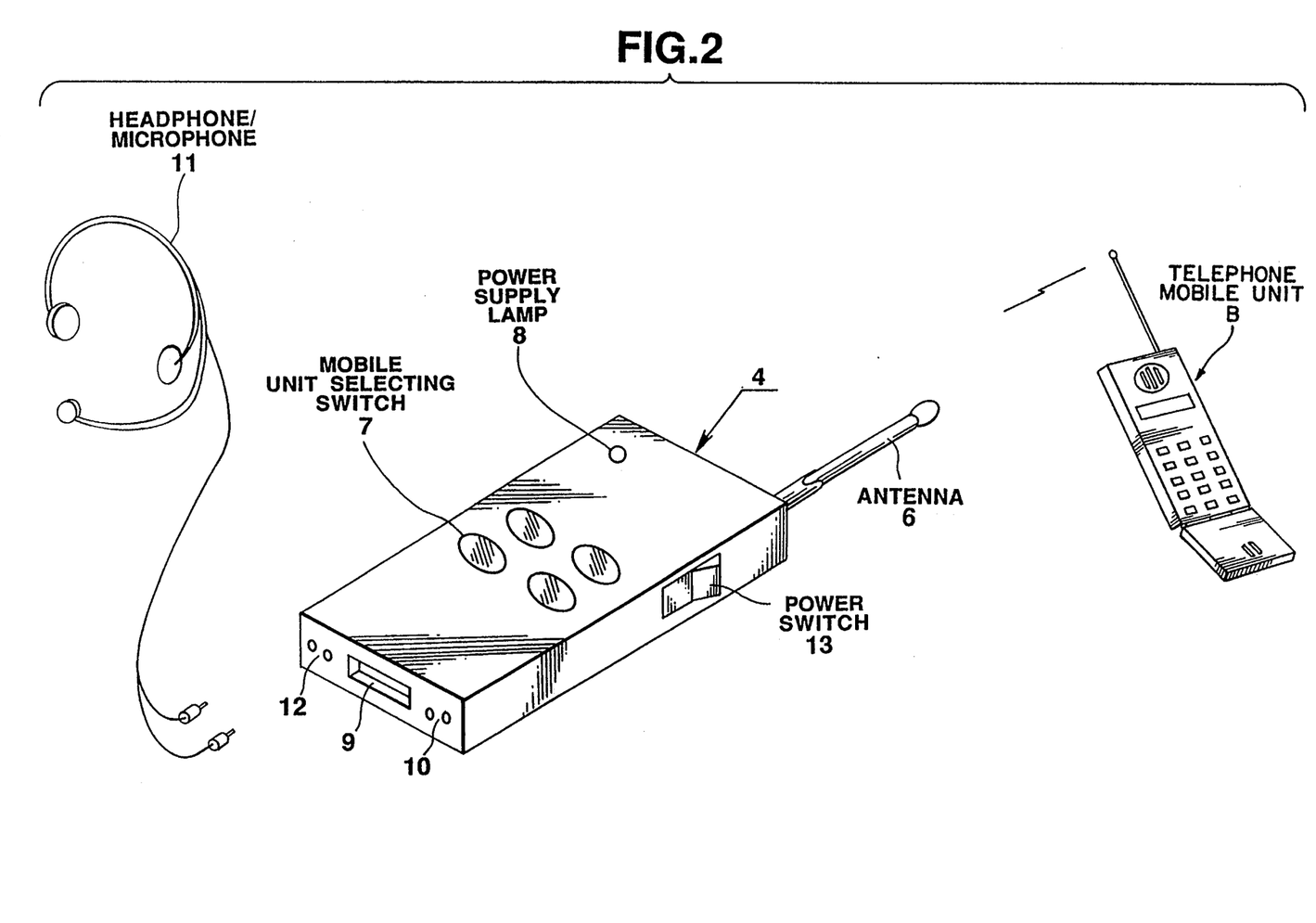
FIG. 2 is a perspective view of a radio communication unit of the first cordless telephone receiver unit shown in FIG. 1.
Figure 3:
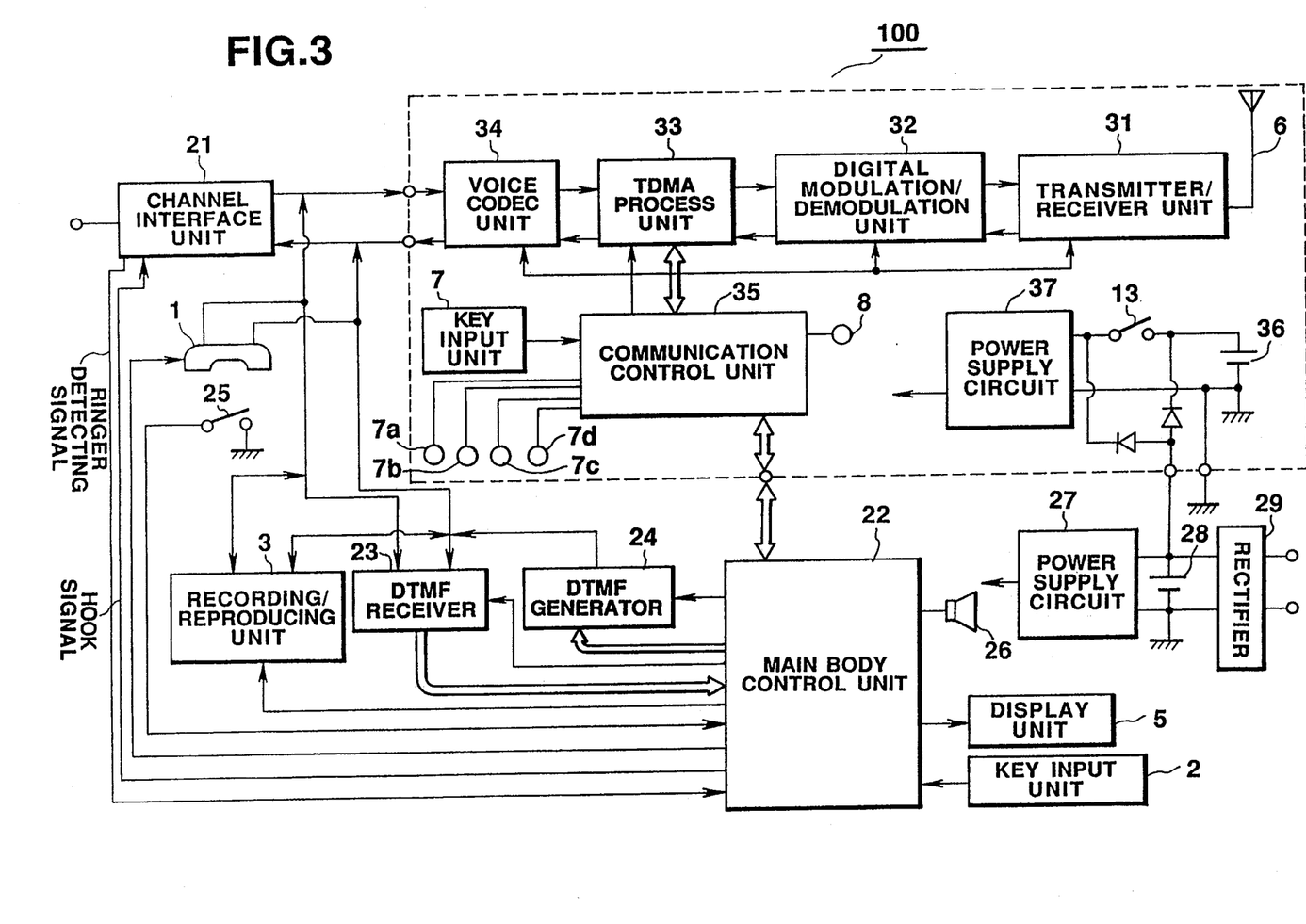
FIG. 3 is a schematic circuit block diagram of the first cordless telephone receiver unit shown in FIG. 1.

Referring now to FIGS. 1 to 3, a cordless telephone system according to a first preferred embodiment of the present invention will be described.

FIG. 1 is a perspective view of a cordless telephone base unit (receiver set) 100 employed in the first cordless telephone system. This cordless telephone base unit 100 is a digital cordless telephone base unit having an automatic telephone message recording function and performing a radio communication between this base unit 100 and a mobile unit B (not shown in detail) in accordance with the TDMA (time division multiple access) method.

As represented in FIG. 1, the first cordless telephone base unit 100 comprises a handset 1, a key input unit 2 for entering a telephone number and also including a message recording switch key 60 for controlling an automatic telephone message recording unit, and an automatic telephone message unit 3. The key input unit 2 also includes a reproducing switch key 61, a recording switch key 62, an extension switch key 63 and a pause switch key 64. A radio communication unit 4 is detachably connected to the base unit 100, and constitutes a major feature of this first cordless telephone system.

Arrangement of Radio Communication Unit in First Cordless Telephone System

As represented in FIG. 2, in the radio communication unit 4, an antenna 6 is provided at an upper surface of a main body of this radio communication unit 4, and a power switch 13 is provided at a side surface of this main body. Furthermore, 4 mobile selecting switches 7 for selecting the mobile units (only one mobile unit B is shown) and a power supply lamp 8 are provided on a front surface of this main body. Furthermore, a connector 9 is provided at a center portion of a bottom surface of this main body, which is used to transmit/receive control data and the like between this radio communication unit and the main body of the first cordless telephone base unit 100. A power supply connector 10 is provided on a right side of the bottom surface, which is employed to receive power supplied from the base unit 100 while the radio communication unit 4 is mounted on the main body of the base unit 100. Also, another connector 12 is provided on a left side of the bottom surface, into which a headphone and microphone terminal is inserted.

Circuit Arrangement of First Cordless Telephone Base Unit

Referring now to FIG. 3, a circuit arrangement of the above-described first cordless telephone base unit 100 will be explained. In FIG. 3, a channel interface circuit 21 comprises a ringer signal detecting unit, a hook switch, and a speech network unit, and the like. This channel interface circuit 21 transmits a signal received from a telephone channel to the handset 1 and the radio communication unit 4 (see FIG. 2), and also transmits a signal inputted from the handset 1 and a signal received from the radio communication unit 4 to the telephone channel. Upon detection of a ringer signal transmitted from a telephone exchange (not shown in detail), this channel interface unit 21 outputs a ringer detecting signal to a main body control unit 22, and also delivers either an on-hook signal, or an off-hook signal to this telephone exchanger in response to a hook signal supplied from the main body control unit 22.

A DTMF receiver 23 detects a DTMF signal originated from the telephone channel or a mobile unit B and outputs a DTMF detection signal to the main body control unit 22. A DTMF generator 24 generates a DTMF signal corresponding to a telephone number entered from the key input unit 2.

A recording/reproducing unit or apparatus 3 records a message on a recording medium such as a magnetic tape or the like which is sent from a subscriber via the telephone exchange, and reproduces the recorded message in response to an instruction sent from the main body control unit 22, and then outputs the reproduced message to either the telephone channel, or the radio communication unit 4.

The main body control unit 22 has various control functions. That is, ON/OFF states of a switch 25 are detected which is turned ON/OFF in response to ON-hook/OFF-hook operations of the handset 1. Furthermore, a telephone number entered by the key input unit 2 is displayed on a display unit 5, the received DTMF signal is analyzed, a calling sound is produced from a ringer speaker 26, and various data are transmitted/received between the radio communication unit 4 and the main body control unit 22.

A power supply unit employed in the first cordless telephone base unit 100 comprises a power supply circuit 27, a battery 28, and a rectifier 29. An AC source voltage of 100 V is rectified by this rectifier 29 to obtain a rectified DC voltage which will then be charged into the battery 28. A DC voltage is applied from this battery 28 to the power supply circuit 27 of the main body and a power supply unit of the radio communication unit 4.

The radio communication unit 4 comprises a transmitter/receiver unit 31 for transmitting/receiving a radio signal to/from a relevant mobile unit, a digital modulation/demodulation unit 32 for digital-modulating/demodulating a transmission signal and a reception signal, and a TDMA process unit 33 for converting a digital data obtained from the digital modulation/demodulating unit 32 into a predetermined format and for time-compressing this format. Also, the radio communication unit 4 comprises a voice codec (coder/decoder) unit 34 for performing data compression/expansion, A/D conversion and D/A conversion of the digital signal, and a communication control unit 35 for judging an ID (identification) code of the base unit 100 and an ID code of the mobile unit B, for detecting a unique word of the TDMA method data, for controlling various operation of circuits, and for transmitting/receiving data with the base unit 100. In addition, the radio communication unit 4 comprises the key input unit 7 including the above-explained 4 mobile-unit selecting switches, and a battery 36 for applying a power source voltage to this radio control unit 4 while this radio control unit 4 is separated from the base unit 100. Finally, this radio communication unit 4 further includes lamps $7a$ to $7d$ which are turned ON when a mobile unit B is called, or the base unit 100 is called by a mobile unit B, and also a power supply lamp 8.

Operation of First Cordless Telephone System

In the first cordless telephone base unit 100 with the above-described circuit arrangements, a radio signal inputted from a mobile unit B (not shown in detail) via the antenna 6 is received by the transmitter/receiver unit 31. This radio signal is then digitally demodulated by the digital modulation/demodulation unit 32. Furthermore, the real data of a predetermined time slot is extracted by the TDMA process unit 33. The extracted data is expanded by the voice codec unit 34 and also converted into an analog voice signal which will then be outputted into the channel interface unit 21 or the handset 1.

On the other hand, voice data transmitted from a telephone caller via the telephone exchange, voice data inputted from a microphone of the handset 1, or voice data reproduced by the recording/reproducing unit 3 is A/D-converted and compressed by the voice coding unit 34. A header portion is added to the compressed voice data by the TDMA processing unit 33, and the resultant data is inserted into a predetermined time slot which will then be outputted to the digital modulation/demodulation unit 32. This data is digitally modulated by the digital modulation/demodulation unit 32, and thereafter, the digital-modulation data is transmitted from the transmitter/receiver unit 31 via the antenna 6 to the relevant mobile unit B.

When the radio communication unit 4 is brought out from a housing or a firm to radio-communicate with a relevant mobile unit B, the radio communication unit 4 is taken out from the first cordless telephone base unit 100, and the terminal of the headphone/microphone 11 is inserted into the connector 12 to turn ON the power switch 13. As a result, a data transmission/reception condition is established. Under such a condition, when a voice is inputted into the microphone 11, the voice signal is converted/compressed by the above-described various circuits, and then transmitted to the mobile unit B as the digital radio signal. Similarly, another radio signal transmitted from a mobile unit B is processed by the above-described circuits to be outputted as a voice from the headphone 11.

As described above, since the radio communication unit 4 capable of receiving the radio signal transmitted from the relevant mobile unit B and of converting the received radio signal into the voice signal, is detachably connected to the first cordless telephone base unit 100, the radio communication unit 4 can be brought to an outdoor field and radio communication is available between this radio communication unit 4 and a relevant mobile unit B.

Second Cordless Telephone System

Figure 4:
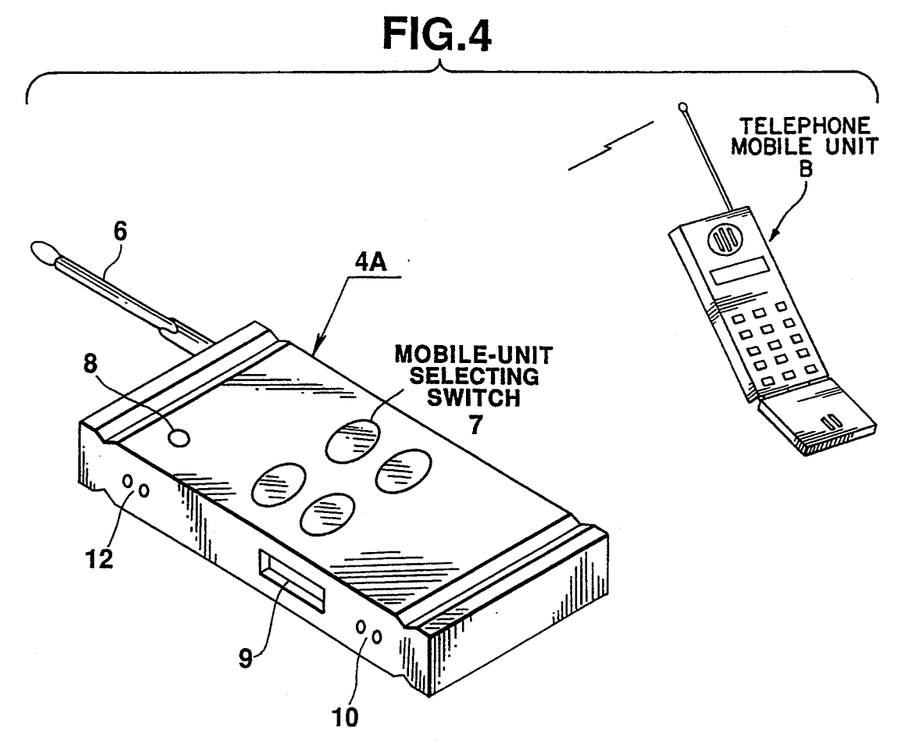
FIG. 4 is a perspective view of a radio communication unit of a cordless telephone receiver unit according to a second preferred embodiment of the present invention.

FIG. 4 is a perspective view of a cordless telephone system according to a second preferred embodiment of the present invention, in which a radio communication unit 4A is employed, and connectors 9, 10 and 12 for connecting the headphone and microphone 11 are provided on the side surface of this unit 4A. In this second preferred embodiment, since the connector 12 for inserting the terminal of the headphone/microphone 11 is provided on the side surface of the main body, even when this radio communication unit 4A is put into a chest pocket of an operator, the cord of the headphone/microphone 11 is not damaged.

Third Cordless Telephone System

Figure 5:
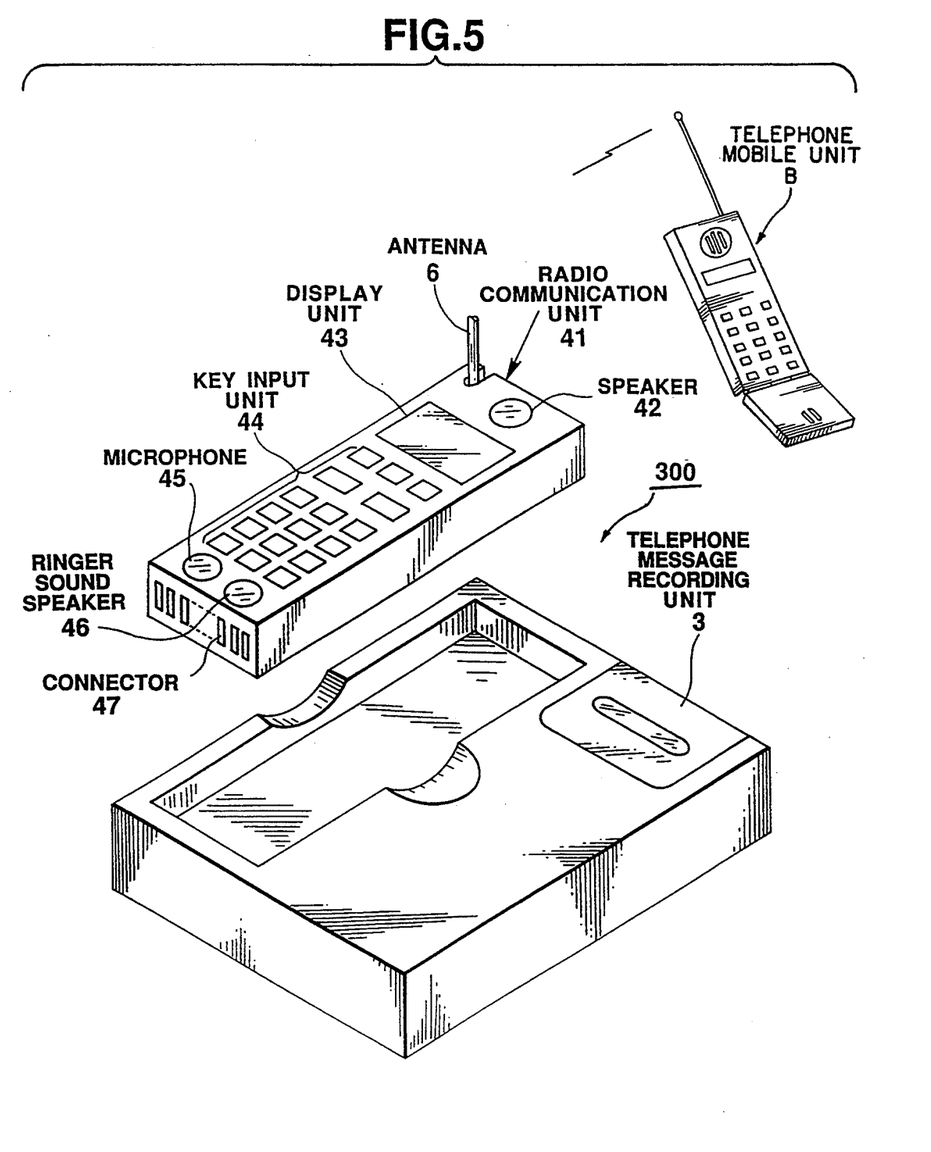
FIG. 5 is a perspective view of a cordless telephone receiver unit according to a third preferred embodiment of the present invention.
Figure 6:
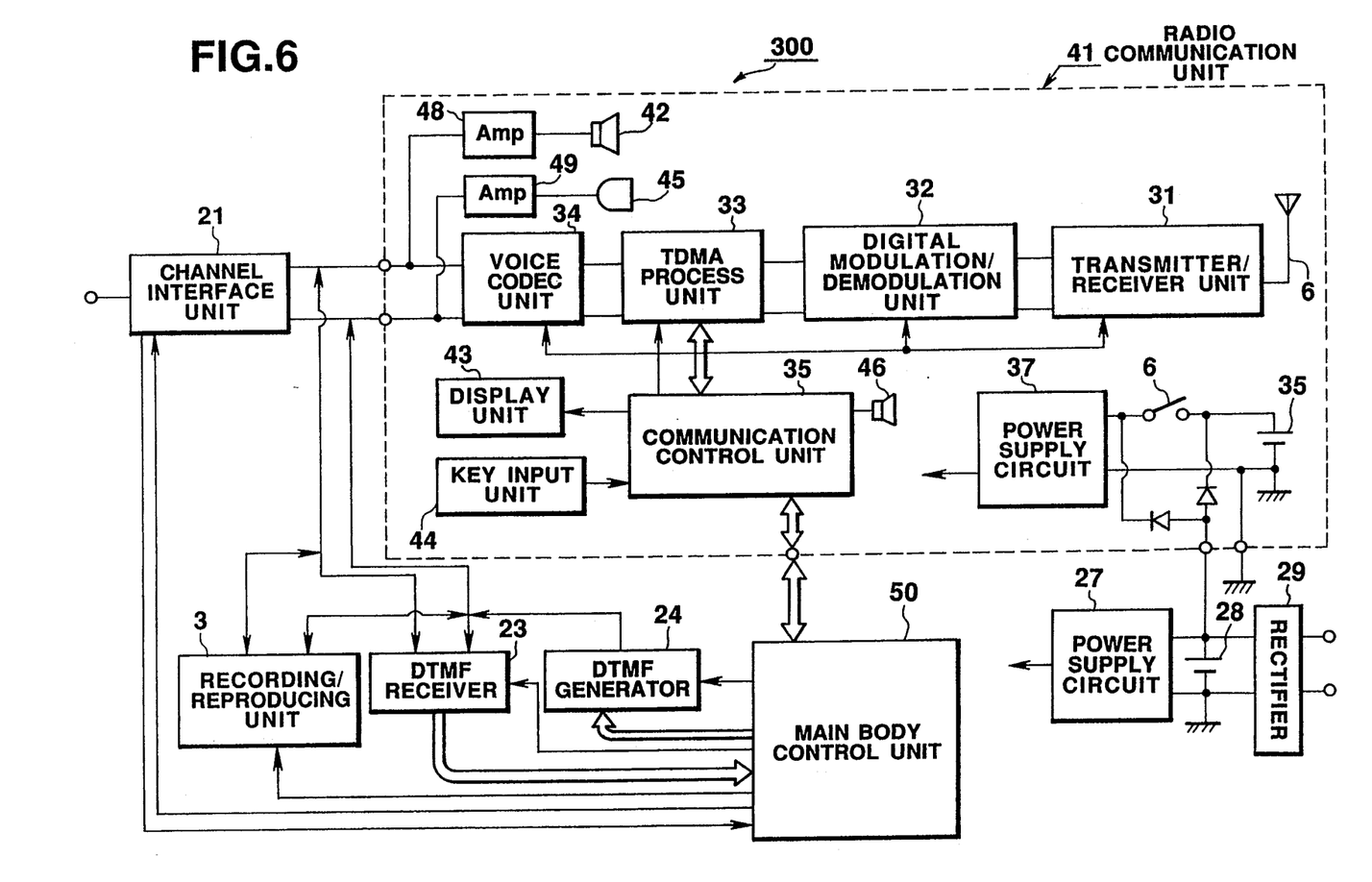
FIG. 6 is a schematic circuit block diagram of the third cordless telephone receiver unit shown in FIG. 5.

FIG. 5 is a perspective view of a cordless telephone base unit 300 according to a third preferred embodiment of the present invention, and FIG. 6 is a circuit diagram thereof. A major feature of the third cordless telephone base unit 300 is that a speaker, microphone, and a dialing button for entering a telephone number are built into a radio communication unit. It should be noted that the same reference numerals shown in FIGS. 1 to 3 will be employed as those for denoting the same, or similar circuit elements in FIGS. 5 and 6.

In FIG. 5, a speaker 42, a display unit 43 for displaying a telephone number, a key input unit 44 for inputting a telephone number, a microphone 44, and a ringer sound speaker 46 are provided on a front surface of a main body of a radio communication unit 41. A connector 47 for transmitting/receiving data between this radio communication unit 41 and the base unit 300 and also for accepting a supply of power is provided on a bottom surface of the main body when this radio communication unit 41 is mounted on the base unit 300. As previously explained, this radio communication unit 41 is detachably connected to the base unit 300.

As seen from the circuit diagram of this third cordless telephone base unit 300 shown in FIG. 6, a major circuit of this radio communication unit 41 is basically the same as that of the first radio communication unit 4 shown in FIG. 3. A different circuit arrangement is as follows. That is, there are provided an amplifier 48 for amplifying an analog voice signal which is produced from the voice coding unit 34 by D/A-converting a voice signal transmitted from a mobile unit B, and also for amplifying a voice signal entered from the channel interface unit 21, and also another amplifier 49 for amplifying a voice signal inputted from the microphone 45 to output the amplified voice signal to the circuit interface unit 21 or the voice codec unit 34. A control unit 50 employed in the base unit 300 detects whether or not the radio communication unit 41 is mounted on the base unit 300, and changes the operation mode into the telephone message recording mode when the radio communication unit 41 is separated from this base unit 300.

As a result, when the radio communication unit 41 is separated from the third telephone base unit 300 and therefore no telephone call is receivable, a telephone message can be recorded on the recording/reproducing unit 3. Thus, even when the radio communication unit 41 is separated from the third telephone base unit 300, it can be prevented that a telephone communication is interrupted. It should be understood that, to the contrary, if the radio communication unit 41 is mounted on the base unit 300, a hands free telephone conversation is available by utilizing the microphone 45 and the speaker 42 built in the radio communication unit 41.

It should also be noted that although the TDMA type digital cordless telephone systems have been described in the above-described preferred embodiments, the present invention is not limited thereto, but can be used, for instance, in an analog cordless telephone system.

What is claimed is:

1. A cordless telephone system comprising:
    a telephone base unit having a main body;
    a radio communication unit detachably connected to said main body of the telephone base unit, said radio communication unit including a transmitting-/receiving means for performing a radio communication with a telephone mobile unit, wherein said transmitting/receiving means performs radio communication with said telephone mobile unit when said radio communication unit is detached from said telephone base unit, and performs radio communication with said telephone mobile unit and further is connectable to a telephone subscriber line when said radio communication unit is connected to said telephone base unit; and
    a telephone channel interface unit provided within said main body of said telephone base unit, for interfacing said radio communication unit with a telephone subscriber line.

2. A cordless telephone system as claimed in claim 1, wherein said main body of said telephone base unit has a storage portion for storing said radio communication unit.

3. A cordless telephone system as claimed in claim 1, wherein said radio communication unit is electrically connected to said telephone channel interface unit when said radio communication unit is electrically connected to said main body of said telephone base unit.

4. A cordless telephone system as claimed in claim 1, wherein said radio communication unit includes a battery, and is powered by said battery when said radio communication unit is separated from said main body of the telephone base unit.

5. A cordless telephone system as claimed in claim 1, wherein said radio communication unit includes:
    mobile unit selecting means for selectively calling one of a plurality of telephone mobile units.

6. A cordless telephone system as claimed in claim 1, wherein said radio communication unit includes a speaker and a microphone, by which a radio communication is carried out between the telephone mobile unit and said radio communication unit.

7. A cordless telephone system as claimed in claim 1, wherein said radio communication unit includes:
    a terminal unit for connection to a speaker and a microphone.

8. A cordless telephone system as claimed in claim 1, wherein said main body of said telephone base unit includes:
  a handset independent of the telephone mobile unit, and capable of communicating with said telephone subscriber line, irrespective of a connection/disconnection state between said radio communication unit and said main body of said telephone base unit.

9. A cordless telephone apparatus with an automatic telephone message recording function, comprising:
  a telephone base unit having a main body;
  a radio communication unit detachably connected to said main body of the telephone base unit, said radio communication unit including a transmitting/receiving means for performing a radio communication with a telephone mobile unit, wherein said transmitting/receiving means performs a radio communication with said telephone mobile unit when said radio communication unit is detached from said telephone base unit, and performs radio communication with said telephone mobile unit and further is connectable to a telephone subscriber line, when said radio communication unit is connected to said telephone base unit;
  a telephone channel interface unit provided within said main body of said telephone base unit, for interfacing said radio communication unit with a telephone subscriber line; and
  an automatic telephone message recording unit provided within said main body of said telephone base unit, for automatically recording a telephone message.

10. A cordless telephone apparatus with an automatic telephone message recording function, as claimed in claim 9, further comprising:
  sensing means for sensing that said radio communication unit is separated from said main body of said telephone base unit, thereby producing a separation sensing signal; and
  control means for controlling an operation mode of said cordless telephone apparatus to be set to an automatic telephone message recording mode in response to said separation sensing signal derived from said sensing means.

11. A cordless telephone apparatus with an automatic telephone message recording function, as claimed in claim 9, wherein said radio communication unit is electrically connected to said telephone channel interface unit when said radio communication unit is electrically connected to said main body of said telephone base unit.

12. A cordless telephone apparatus with an automatic telephone message recording function, as claimed in claim 9, wherein said radio communication unit includes:
  a key input unit for inputting a telephone number;
  a speaker for audibly reproducing a voice of a telephone user; and
  a microphone for picking up a voice of a telephone user.

13. A cordless telephone apparatus with an automatic telephone message recording function, as claimed in claim 12, wherein when said radio communication unit is connected to said main body of the telephone base unit, said main body of the telephone base unit performs a telephone communication with the telephone subscriber line with employment of said key input unit, said speaker, and said microphone.

14. A cordless telephone apparatus with an automatic telephone message recording function, as claimed in claim 13, wherein when said radio communication unit is connected to the main body of said telephone base unit, said cordless telephone apparatus with the automatic telephone message recording function is operable as a hands-free telephone apparatus.

* * * * *